United States Patent [19]
Heideloff

[11] Patent Number: 5,931,423
[45] Date of Patent: Aug. 3, 1999

[54] CONDUIT SUPPORTING BRACKET

[75] Inventor: Drew B. Heideloff, Lakewood, Ohio

[73] Assignee: Electrocast Corporation, Cleveland, Ohio

[21] Appl. No.: 08/868,486

[22] Filed: Jun. 3, 1997

Related U.S. Application Data

[60] Provisional application No. 60/035,787, Jan. 8, 1997.

[51] Int. Cl.[6] ........................................ F16L 3/08
[52] U.S. Cl. .................... 248/74.4; 248/74.1; 248/219.3; 248/316.6
[58] Field of Search .................................. 248/74.1, 74.4, 248/67.5, 68.1, 65, 231.41, 231.61, 316.4, 316.6, 219.3; 211/70.4; 411/84, 85, 104, 400, 906

[56] References Cited

U.S. PATENT DOCUMENTS

| | | | |
|---|---|---|---|
| 429,357 | 6/1890 | McBee | 248/68.1 |
| 1,911,380 | 5/1933 | McFarlin | 248/316.1 |
| 2,354,919 | 8/1944 | Lockwood. | |
| 2,625,354 | 1/1953 | Smith. | |
| 2,990,151 | 6/1961 | Phillips | 248/219.3 |
| 3,186,051 | 6/1965 | Waddell. | |
| 4,431,152 | 2/1984 | Reed, Jr. | 248/65 |
| 4,460,142 | 7/1984 | O'Rorke | 248/230.8 |
| 4,775,122 | 10/1988 | McClymont. | |
| 4,799,641 | 1/1989 | Koreski | 248/68.1 |
| 4,801,115 | 1/1989 | Heard | 248/219.3 |
| 5,031,864 | 7/1991 | Krol. | |
| 5,249,765 | 10/1993 | Garcia | 248/475.1 |
| 5,284,267 | 2/1994 | Polletta et al. | 248/74.4 X |
| 5,472,160 | 12/1995 | Burek et al. | 248/74.4 |

*Primary Examiner*—Derek J. Berger
*Attorney, Agent, or Firm*—Fay, Sharpe, Beall, Fagan, Minnich & McKee

[57] ABSTRACT

A conduit supporting bracket according to the present invention supports one or more conduits in a spaced relation on a support structure. The bracket includes an inner half or base portion and an outer half or keeper portion which can be quickly and easily assembled to support a plurality of conduits between the base and the keeper. The base portion includes a slotted neck by which the conduit supporting bracket is attached to the support structure. The base portion also includes parallel slots opening on a top surface of the base portion for receiving parallel shafts of the keeper portion. The base portion and keeper portion include conduit retaining grooves having multiple radii for receiving and retaining conduits of different diameters.

5 Claims, 8 Drawing Sheets

CONDUIT SUPPORTING BRACKET

This application claims the benefit of U.S. Provisional patent application Ser. No. 60/035,787, filed Jan. 8, 1997.

BACKGROUND OF THE INVENTION

1. Field of the Invention

The invention relates to a conduit supporting bracket for maintaining one or more conduits or other channels in a substantially fixed relation to a supporting structure and, more particularly the invention relates to an easily assembled conduit supporting bracket and method of assembly.

2. Description of the Related Art

A conduit which houses electrical wires or cables is generally supported over the length of its run on a support surface such as an electric pole, a building, or other structure. The conduit is generally supported in a parallel spaced arrangement on the support surface by a clamping device.

One type of clamping device which may be used to hold a plurality of conduits includes a set of conduit receiving blocks which are constructed with conduit seats or grooves on facing surfaces of the blocks to receive and trap the conduits between the two blocks. A first of the two blocks is generally connected to a support surface and includes a plurality of fixed shanks extending away from the support surface between the grooves for attaching the second block. The second block of the clamping device is connected to the first block by inserting the plurality of shanks of the first block through a set of corresponding openings in the second block and tightening a nut on the end of each of the shanks.

One such multiple conduit clamping device is described in U.S. Pat. No. 2,354,919. However, this type of conduit clamping device is difficult to use because the user must align each of the conduits within each of the conduit grooves at the same time as the user attempts to insert the shanks of the first block into the openings of the second block and to tighten the second block in place. This type of clamping device also provides only a single length standoff between the conduit and the supporting structure. Further, to install this clamping device on a pole, the user must use two wrenches, one to hold the head of the bolt and one to rotate the nut.

SUMMARY OF THE INVENTION

The invention relates to a conduit supporting bracket for supporting a conduit or other channel on a support structure which can be quickly and easily installed and used to support one or more conduits or channels in a spaced relation to the support structure.

According to one aspect of the present invention, a conduit supporting bracket includes a base portion and a keeper portion. The base portion has an upper surface, a side surface including at least one conduit retaining groove, and an extending neck portion for connecting the base portion to a support structure. Two parallel slots are formed in the base portion and opening in the upper surface of the base portion. The keeper portion includes a side surface including at least one conduit retaining groove and two parallel shanks extending from the side surface of the keeper portion. The shanks are arranged to be received in the parallel slots in the base portion such that the at least one conduit retaining groove in the base portion is substantially aligned with the at least one conduit retaining groove in the keeper portion.

According to a more limited aspect of the present invention, fasteners are provided on the shanks to fix the keeper portion to the base portion of the bracket.

According to another aspect of the invention, the extending neck portion includes a plurality of cavities for receiving the head of a fastening member and the neck portion may be cut to achieve a desired standoff from the support structure.

According to an additional aspect of the present invention, a conduit supporting bracket includes a first bracket part and a second bracket part. The first bracket part includes a conduit engaging surface, means for attaching the first part to a support structure, and a plurality of parallel slots formed in a first surface of the first bracket part. The second bracket part includes a conduit engaging surface and a plurality of parallel threaded shafts spaced to be received in the plurality of parallel slots in the first bracket part. At least one threaded fastener is threaded onto each of the plurality of threaded shafts. The threaded shafts of the second bracket part can be inserted into the parallel slots of the first bracket part such that the conduit engaging surfaces of the first and second bracket parts face one another without removing the at least one threaded fastener from each of the plurality of shafts.

According to a further aspect of the present invention, a method of installing a conduit on support structure includes the steps of: fixing a base portion of a conduit supporting bracket to a support structure by sliding a slotted neck of the base portion over a head of a fastener and tightening a nut on an opposite end of the fastener; inserting at least one conduit in a conduit receiving groove of the base portion; installing a keeper portion over the at least one conduit by sliding a plurality of threaded shafts of the keeper portion into corresponding upward opening slots in the base portion; and securing the conduit between the base portion and the keeper portion by tightening a plurality of fasteners on the plurality of threaded shafts.

The bracket according to the present invention is more easily assembled than known brackets. In addition, the bracket can be mounted on a variety of different types of support structures in different ways and can be cut to provide any desired standoff or distance between the supported conduit and the support structure.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which formed a part hereof, and wherein.

DETAILED DESCRIPTION OF THE PREFERRED EMBODIMENTS

Figure 1:
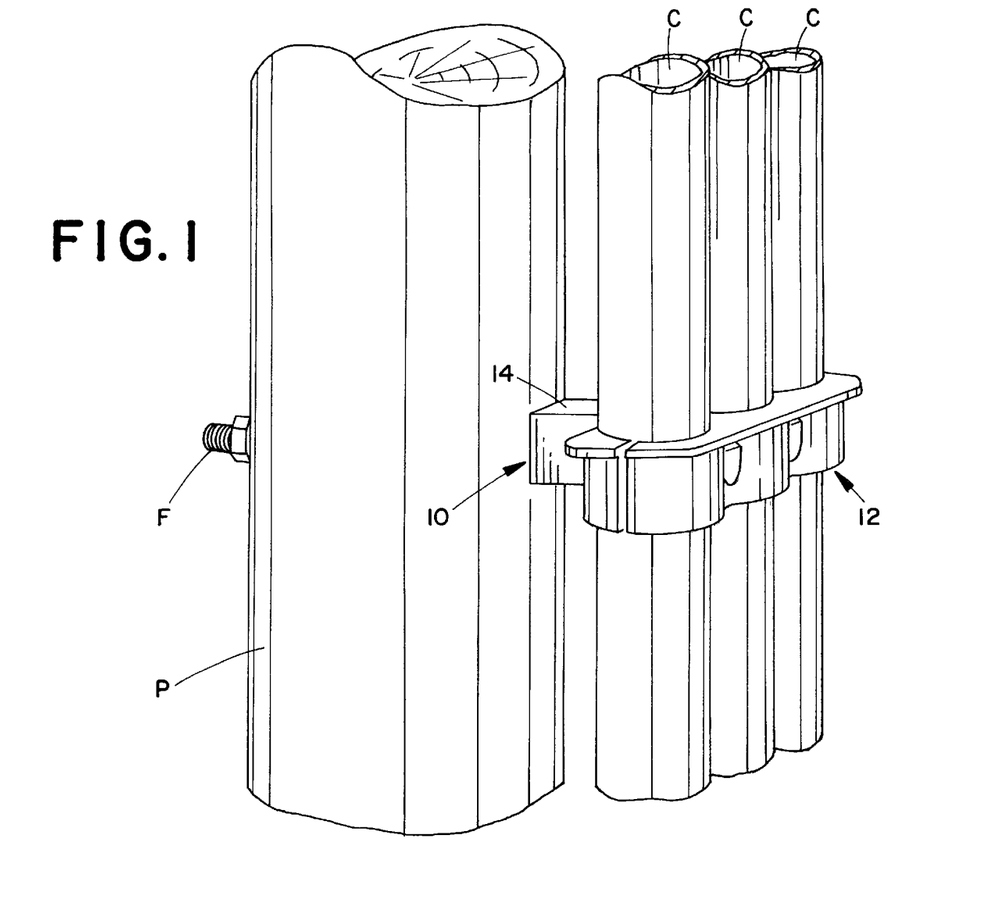
FIG. 1 is a perspective view of a conduit supporting bracket formed according to the present invention and shown in a mounted position to a support structure.
Figure 2:
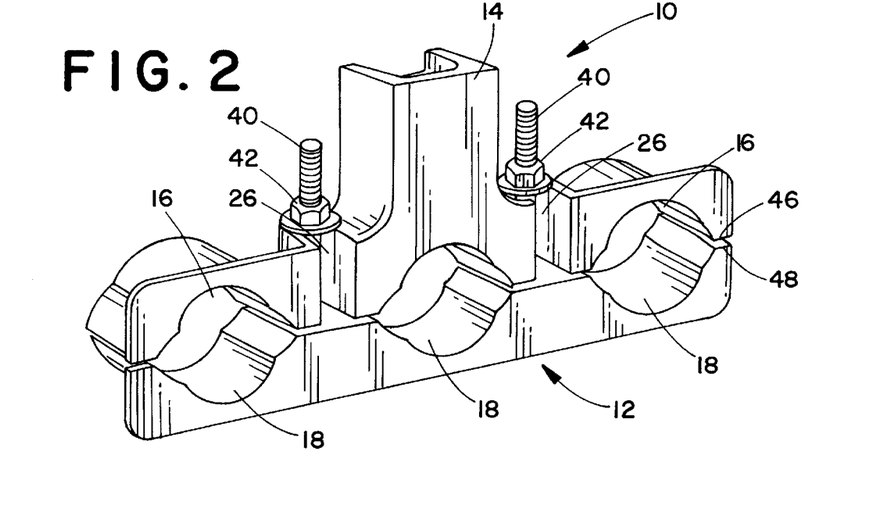
FIG. 2 is a top perspective view of the conduit supporting bracket of FIG. 1.

Referring now to the drawings wherein the showings are for purposes of illustrating preferred embodiments of the invention only and not for purposes of limiting same, FIGS. 1 and 2 show the overall arrangement of a conduit supporting bracket including an inner half or base portion 10 and an outer half or keeper portion 12. When the bracket is mounted on or to a support structure, the base portion 10 is positioned adjacent the support structure. The base portion 10 includes a slotted neck 14 by which the conduit supporting bracket is attached to the support structure such that the conduits or other channels are spaced from the support structure by the length of the neck. This distance that the conduits are spaced from the support structure is called a standoff.

The support structure to which the bracket is attached is generally a conventional electrical support pole P having a bolt type fastener F extending therethrough. However, base portion 10 of the bracket may also be attached to other types of support structures such as buildings. The conduits C which are retained by the conduit supporting bracket are generally plastic or metal conduits which house electrical cables or lines. However, the present invention may also be used to receive and retain other types of substantially cylindrical conduits including pipes, channels, cable members, or housings for air, water, gas, or telephone lines.

As illustrated in FIG. 2, the base portion 10 of the bracket includes conduit retaining grooves 16 formed in a facing surface 46 of the base portion for receiving the plurality of conduits C. The keeper portion 12 also includes conduit retaining grooves 18 in a facing surface 48 of the keeper portion which oppose the conduit retaining grooves 16 of the base portion 10. As will be described in further detail below, the conduit retaining grooves 16, 18 are preferably arranged to receive conduits or channels of different sizes. Also illustrated in FIG. 2 are two threaded shanks 40 and two nut type fasteners 42. The two threaded shanks 40 are fixed to or cast with the keeper portion 12 of the bracket and extend through slots 26 in the base portion 10.

Figure 3:
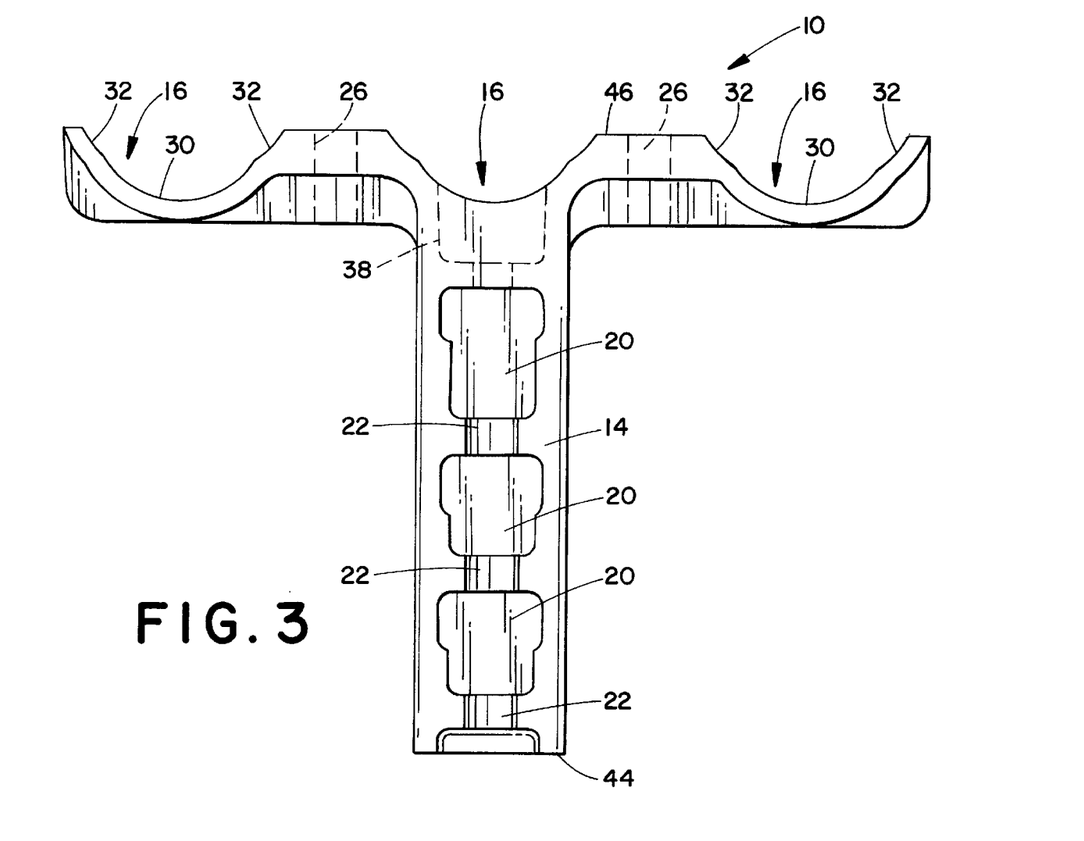
FIG. 3 is a bottom view of a three conduit supporting bracket base portion formed according to a first embodiment of the present invention.

FIG. 3 is a bottom view of the base portion 10 of a conduit supporting bracket which is adapted to receive up to three conduits or channels within the three conduit retaining grooves 16. The neck 14 extends from the body of the base portion 10 and includes a plurality of interior cavities 20. Each of the cavities 20 opens downwardly and includes a wider portion and a narrower portion. The cavities 20 are connected to each other and to an end surface 44 of the neck 14 by fastener receiving slots 22. The narrower portions of the cavities 20 are dimensioned to receive the head of a fastener without allowing the fastener to rotate. The wider portions of the cavities 20 reduce the overall weight of the bracket.

The neck 14 is designed with the plurality of cavities 20 so that the neck can be cut down to different lengths to achieve a desired standoff or distance between the mounted conduits and the support structure. The neck may be cut by either the manufacturer or by the user in any known manner to achieve the proper standoff distance.

When the base portion 10 is to be mounted on a support structure, the threaded fastener F is positioned in or on the support structure or pole P. A head of the threaded fastener F which projects from the support structure P is received in the neck 14 of the base portion 10 such that a post of the fastener extends through the slots 22 and a head of the fastener is received within the narrower part of one of the interior cavities 20 of the neck.

In attaching the base portion 10 to the support structure, the base portion is preferably oriented so that the cavities 20 and the slot 22 open in a downward direction. When the fastener receiving slot 22 is slipped over the shank of the fastener F in a downward direction, the base portion 10 is easily maintained in place by the friction between the head of the fastener and the cavity walls while a nut N disposed on an opposite end of the support structure from the fastener head is advanced along the threaded shank of the fastener F into a body retaining position relative to the support structure. Thus, the present invention allows one-handed installation of the base portion 10 on the fastener P.

Figure 4:
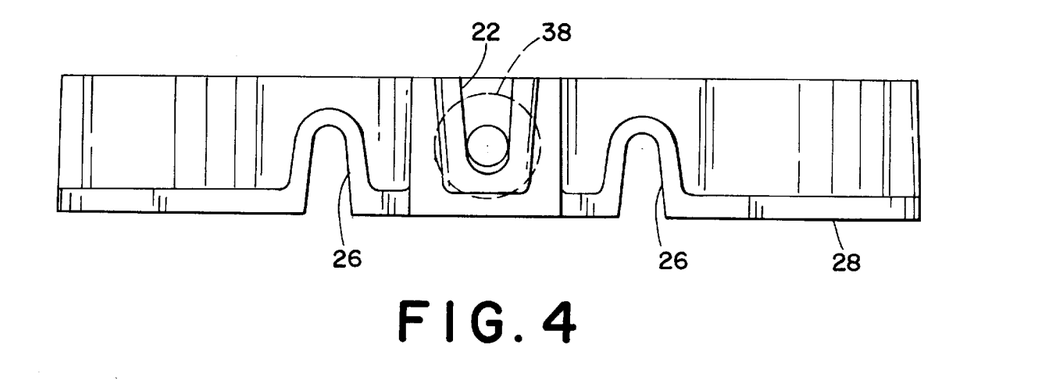
FIG. 4 is a back view of the three conduit supporting bracket base portion of FIG. 3.

The base portion 10 in the embodiment of FIGS. 3 and 4 also includes a slightly tapered two diameter bore 38 extending from a center one of the conduit retaining grooves 16 into a first of the cavities 20. The bore 38 may be used for alternative methods of mounting the bracket to a support structure. For example, when a wood screw is used to attach the bracket to a support structure, the wood screw can be inserted through the bore 38 with the head received in the larger diameter portion of the bore. Other types of lags such as a lag for use with an expansion anchor can also be inserted through the bore 38. In addition, the bore 38 may be used when the bracket is mounted in an orientation other than the orientation illustrated in FIG. 1 such as on a ceiling where a fastener F could slip out of the slots 22.

The tapered bore 38 also allows the bracket to be used to achieve a flush mount without a standoff by cutting the bracket neck 14 close to the base of the neck through the first of the cavities 20 and attaching the base portion 10 by using a fastener located within the bore 38.

FIG. 4 shows that the base portion 10 also includes two parallel slots 26 opening in an upper surface 28 of the base portion. The base portion 10 is inverted in FIG. 4, thus, the upper surface 28 is located at a lower part of the FIG. The parallel slots 26 are arranged to receive the two threaded shanks 40 of the keeper portion 12 as illustrated in FIG. 2.

With reference to FIG. 3, each of the grooves 16 is defined by multiple radii for accommodating conduits or channels of different diameters. More particularly, the conduit retaining grooves 16 comprise concave grooves defined by a first semi-cylindrical surface 30 having a first radius of curvature and second semi-cylindrical surfaces 32 on either side of the first semi-cylindrical surface 30. The second semi-cylindrical surfaces 32 have a larger radius of curvature than the first semi-cylindrical surface 30. Therefore, the bracket may be advantageously used to retain conduits C having at least two different radii. Although two radii grooves 16 have been illustrated, it will be appreciated that the bracket may also employ conduit retaining grooves having more than two radii without departing from the overall intent or scope of the invention.

The conduit retaining grooves 16 extend in a parallel spaced relation to each other. The parallel fastener receiving slots 26 face upwardly when the base portion is attached to a support structure in the bracket orientation shown in FIG. 1. These slots 26 extend through the base portion 10 intermediate adjacent ones of the conduit receiving grooves 16.

Figure 5:
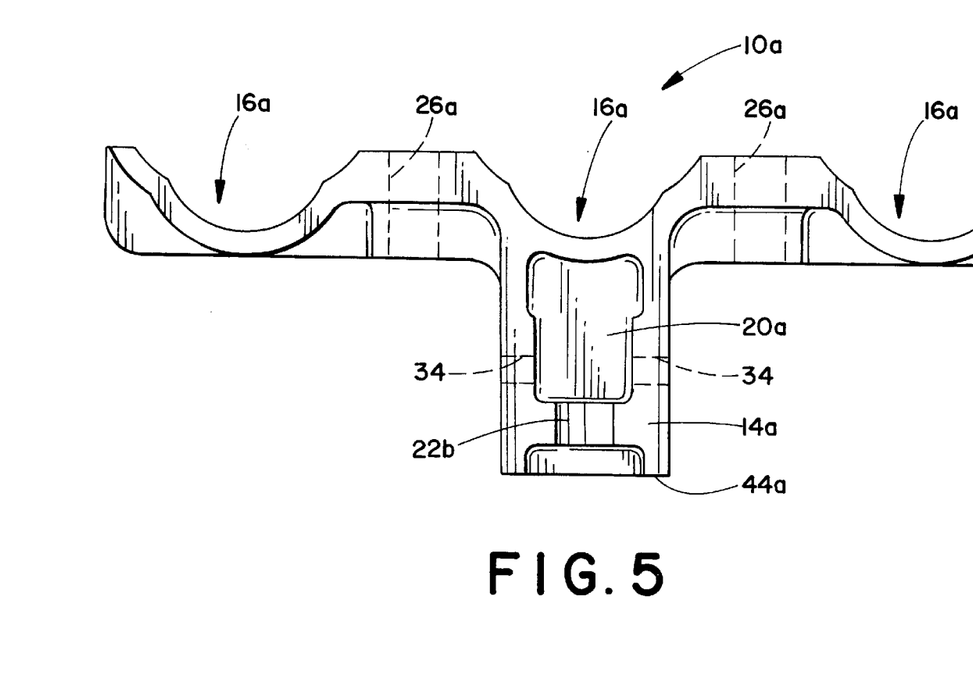
FIG. 5 is a bottom view of a second embodiment of a three conduit supporting bracket base portion which has been cut to achieve a desired standoff.
Figure 6:
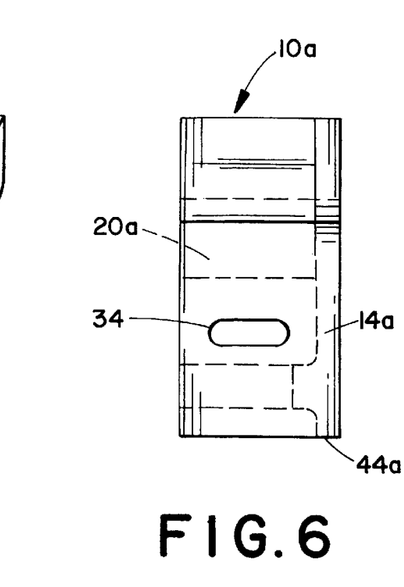
FIG. 6 is a side view of the three conduit supporting bracket base portion of FIG. 5.

FIGS. 5 and 6 illustrate a variation of the bracket base portion of FIGS. 3 and 4 in which the neck 14a of the base portion 10a has been cut to a desired standoff, forming a new end surface 44a. Like components have been identified with an "a" suffix and new components are identified by new numerals for ease of appreciating the structure involved in the embodiment of FIGS. 5 and 6. In the FIG. 5 embodiment, the base portion 10a may be attached to a support structure in the manner described above by inserting the head of a fastener into the interior cavity 20a and tightening a nut on an opposite end of the fastener to secure the base portion 10a in place.

Alternatively, as shown in FIGS. 5 and 6, the base portion 10a includes two oval shaped openings 34 provided in opposite sides of the slotted neck 14a. The openings 34 are used to attach the base portion 10a to a support structure, such as a concrete or steel pole, by the use of a flexible band fastener (not shown). The flexible band fastener is preferably formed of a durable, flexible, and non-corrosive material, such as stainless steel. The band fastener is inserted through the slotted neck 14a by passing the band through the two oval openings 34 and through the interior cavity 20a. This band fastener is then secured around the support structure in a known manner. The oval openings 34 may be formed by the manufacturer or by the user at any one or more desired locations along the length of the neck 14a.

FIGS. 5 and 6 illustrate a base portion of a bracket similar to that of FIGS. 2 and 4 which has been cut at the wider portion of a central cavity 20a to achieve a relatively short standoff length. The neck 14a is preferably approximately eight inches long prior to cutting so that standoffs of up to eight inches can be provided by the same bracket. The plurality of cavities 20a are provided along a length of the neck 14a for ease of attachment with fasteners of different lengths. For example, when an eight inch standoff is desired and the neck 14a is used at its full length as shown in FIG. 3, a fastener head may be positioned in any one of the cavities 20 depending on the length of the fastener F used. The number of cavities 20a in the neck 14a may be varied depending on the particular application.

Figure 7:
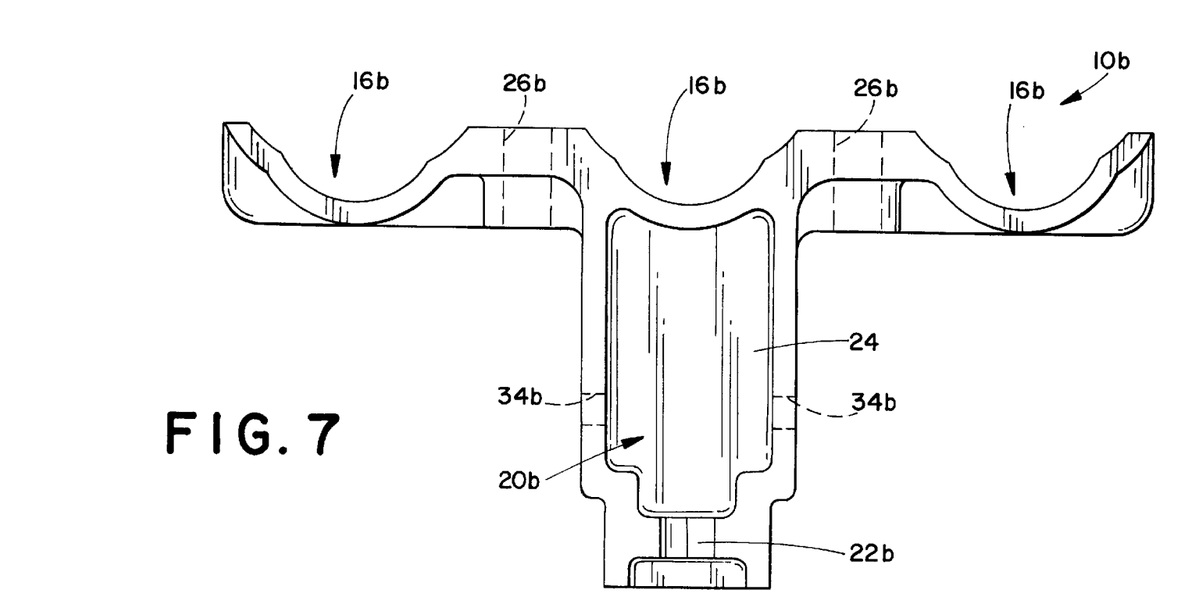
FIG. 7 is a bottom view of a three conduit supporting bracket base portion formed according to a third embodiment of the invention.
Figure 8:
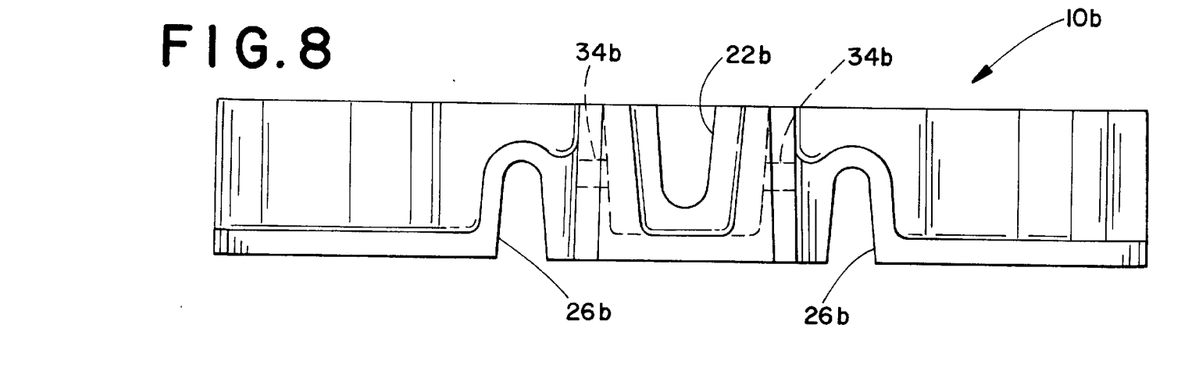
FIG. 8 is a back view of the three conduit supporting bracket base portion of FIG. 7.

FIGS. 7 and 8 illustrate an alternative embodiment of a three conduit supporting bracket base portion 10b according to a third embodiment of the invention. There, like components are identified by like numerals with a "b" suffix and new components are identified by new numerals for ease of appreciating the structure involved. This embodiment of the invention incorporates a wider portion 24 of the interior cavity 20b which is elongated to accommodate a wrench. The elongation of the interior cavity 20b to accommodate a wrench is an alternative to providing the bore 38 (FIGS. 3 and 4) for inserting a lag fastener. This embodiment may be made with or without the openings 34b for attaching the base portion 10b to a support structure by a flexible band fastener in the manner previously described.

Figure 9:
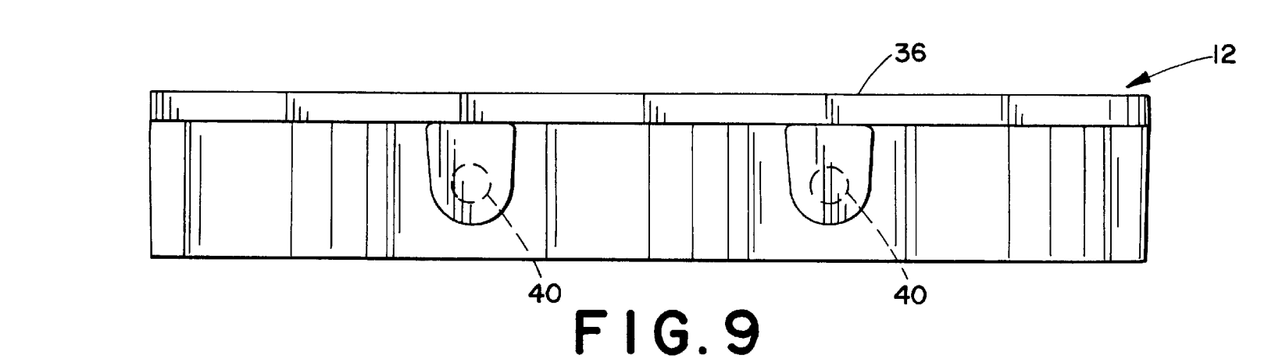
FIG. 9 is a front view of a keeper for use with the base portions of FIGS. 3–8.

FIG. 9 is a front view of the keeper portion 12 of the conduit supporting bracket formed according to the present invention. The keeper portion 12 includes the three multiple radii conduit retaining grooves 18, shown in the bottom view of FIG. 10, which correspond to the conduit retaining grooves 16 in the base portion 10. Two threaded shanks 40 project from the facing surface 48 of the keeper portion 12 that includes the conduit retaining grooves 18. These threaded shanks 40 are permanently fixed and non-rotatable in the keeper portion 12, and are disposed generally parallel to a top surface 36 of the keeper and normal to the facing surface 48 of the keeper portion 12.

When the base portion 10 is fixedly secured to a support member with a plurality of conduits C or channels properly positioned within the conduit retaining grooves 16, as shown in FIG. 1, the keeper portion 12 is easily mounted on the base portion for securely retaining the conduit in a desired position. The keeper portion 12 is simply positioned so that the threaded shanks 40 are received through the parallel slots 26 in the base portion 10. Conventional fasteners, such as nuts 42, are then advanced onto and along the threaded shanks 40 to closely and tightly embrace the conduits or channels between the base portion 10 and the keeper portion 12.

The attachment of the keeper portion 12 to the base portion 10 according to the present invention is far more efficient and easier than the attachment or assembly processes in known systems because the threaded shanks 40 are slipped into the slots 26 rather than having to thread shanks through cooperating bores or receiving openings in another member. In addition, the nuts 42 may be threaded onto the threaded shanks 40 prior to attaching the keeper portion 12 which improves ease of assembly. The conduit supporting bracket formed according to the present invention allows the conduits C or channels to be easily mounted and retained in a desired spaced relationship relative to the support structure and to each other.

Figure 10:
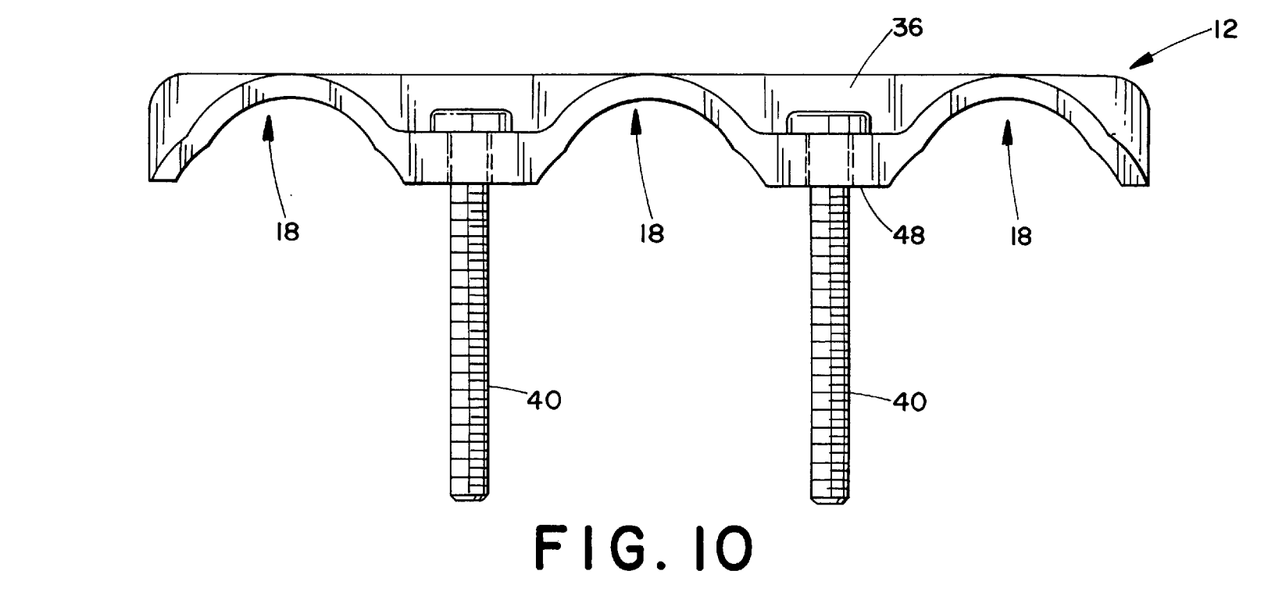
FIG. 10 is a bottom view of the keeper of FIG. 9.
Figure 11:
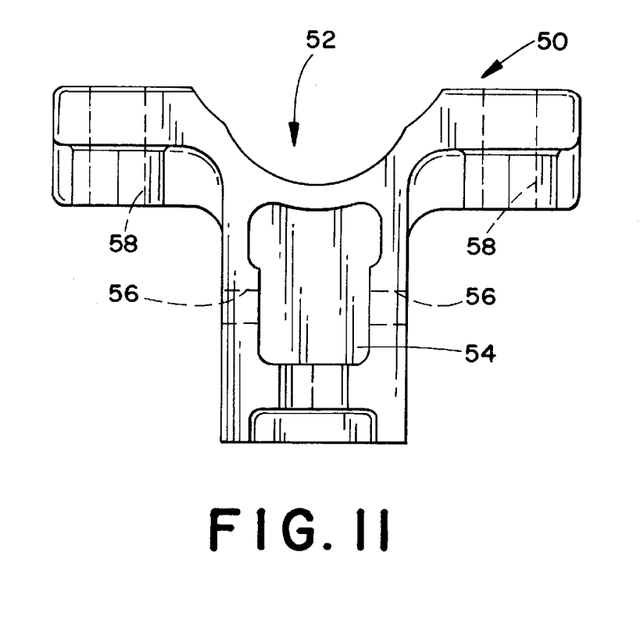
FIG. 11 is a bottom view of a one conduit supporting bracket base portion formed according to a fourth embodiment of the present invention.
Figure 12:
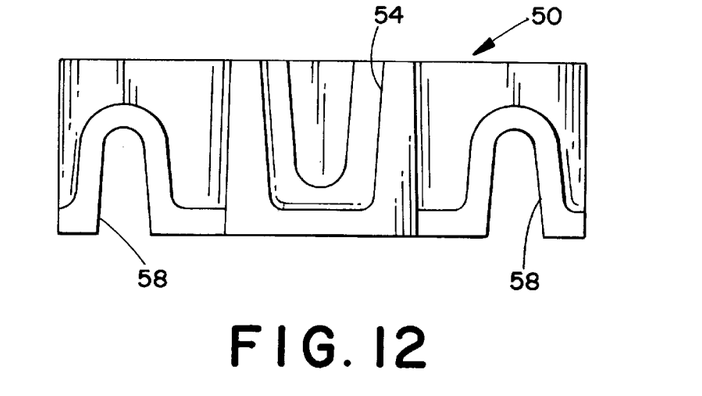
FIG. 12 is a back view of the one conduit supporting bracket base portion of FIG. 11.
Figure 13:
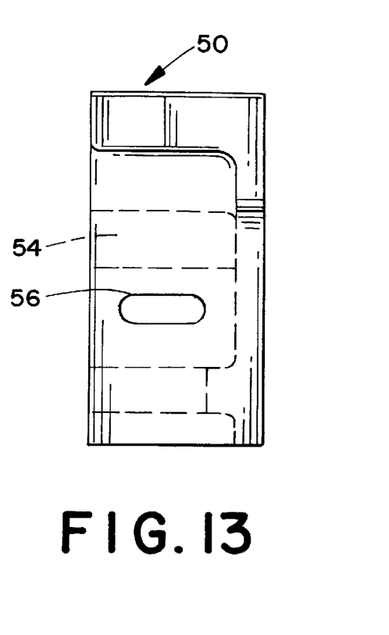
FIG. 13 is an side view of the one conduit supporting bracket base portion of FIG. 11.

FIGS. 11–13 illustrate a base portion 50 of a conduit supporting bracket for supporting a single conduit or channel. The conduit supporting bracket of this arrangement is similar in structure to the one described above with respect to FIGS. 1–10 except that it includes but a single multiple radii conduit retaining groove 52 positioned between two parallel slots 58. The bracket base portion 50 may be installed on a support structure either by placing the cavity 54 over a fastener F or by use of a band clamp inserted through the two slots 56.

Although the illustrated embodiments incorporate either one, two, or three conduit retaining grooves, it should be understood that a bracket formed according to the present invention could have other numbers of grooves. Where more than three conduit retaining grooves are employed in a single bracket, it may be desirable to incorporate more than two threaded shanks for use in attaching the bracket keeper portion to the base portion.

Figure 14:
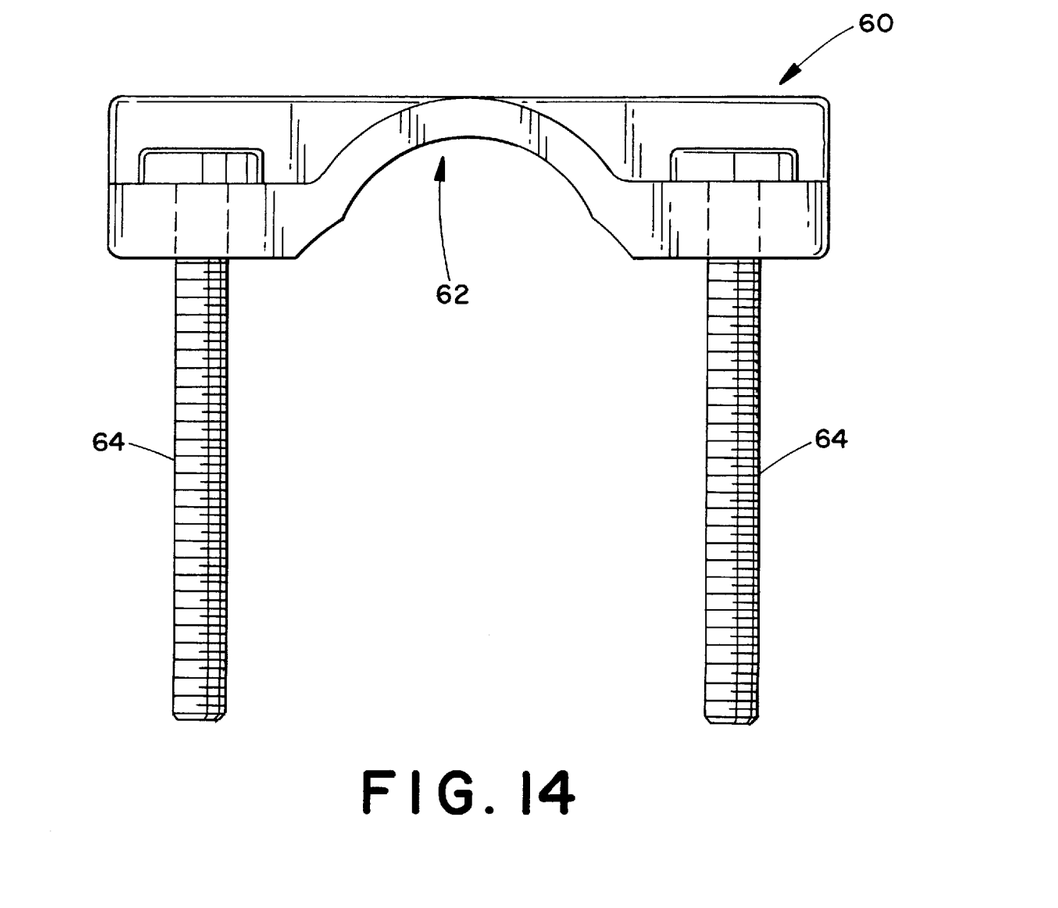
FIG. 14 is a bottom view of a keeper for use with the base portion of FIGS. 11–13.
Figure 15:
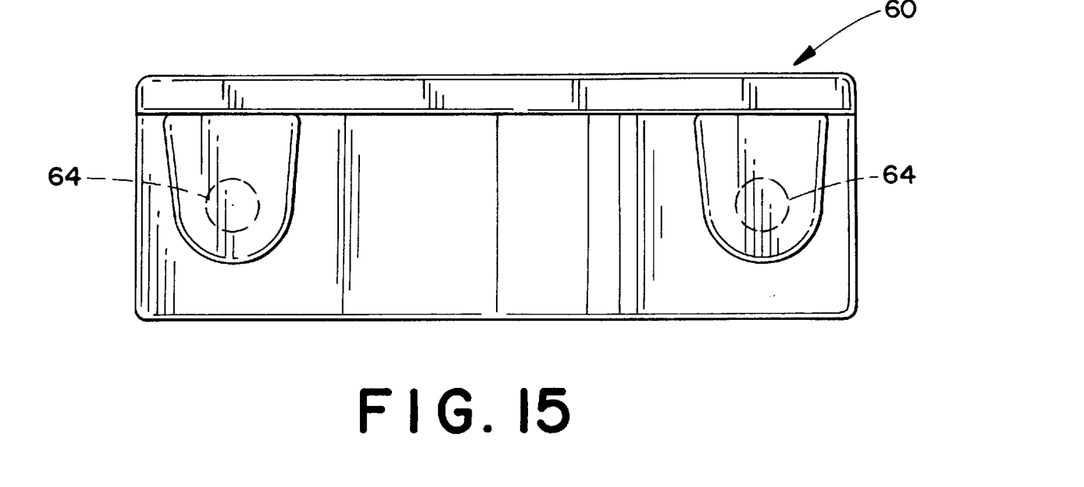
FIG. 15 is a front view of the keeper of FIG. 14.

A keeper portion 60 for the one conduit retaining bracket 50 is illustrated in FIGS. 14 and 15. The keeper portion 60 corresponds substantially to the keeper portion 12 as illustrated in FIGS. 9 and 10 except that it includes only one conduit retaining groove 62. Two shanks 64 of the keeper portion 60 are arranged to slide into the corresponding slots 58 of the base portion 50.

Figure 16:
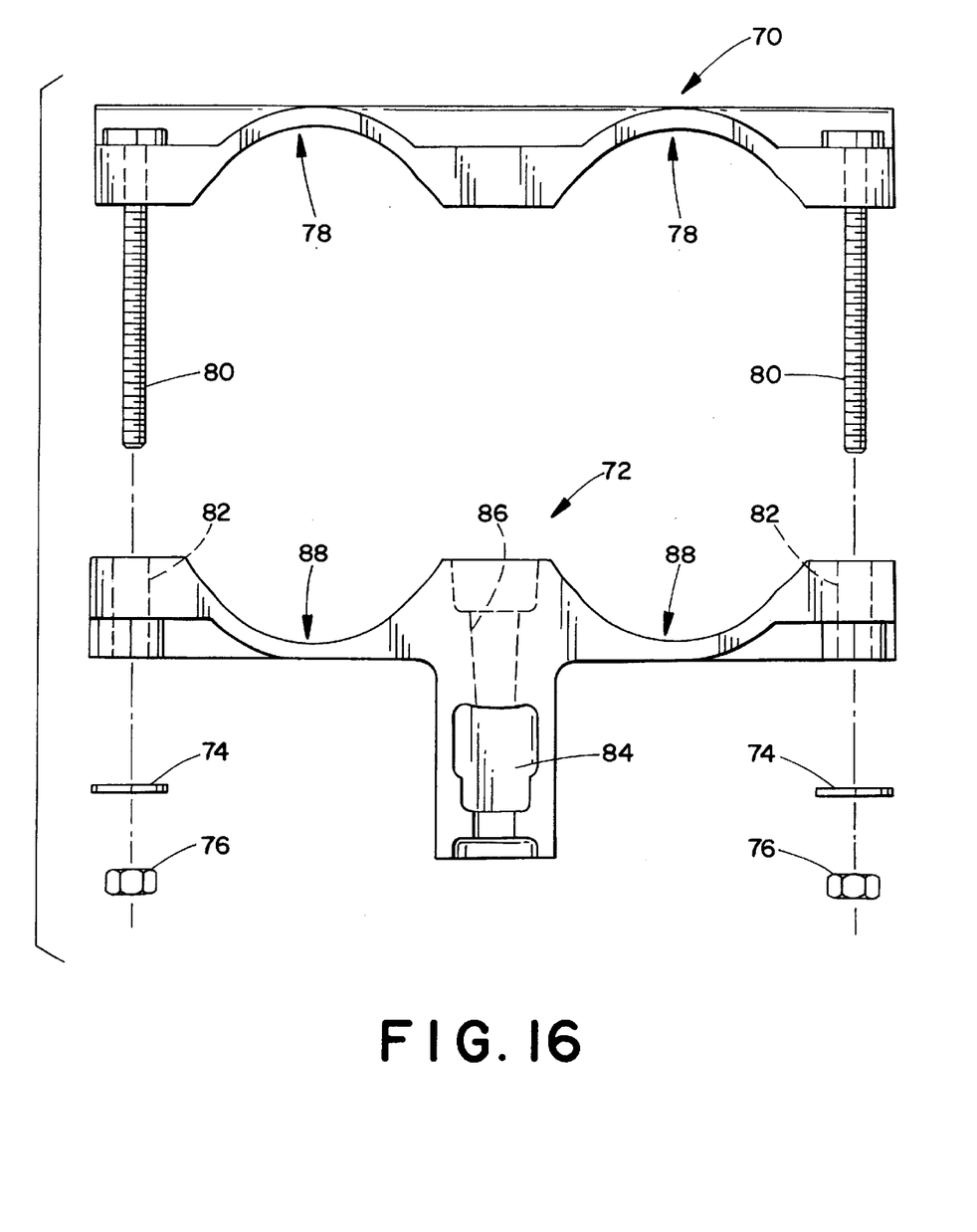
FIG. 16 is an exploded bottom view of a two conduit supporting bracket according to the present invention.

FIG. 16 illustrates a two conduit supporting bracket including a keeper portion 70, a base portion 72, two washers 74, and two nut type fasteners 76. The keeper portion 70 has two multiple radii conduit retaining grooves 78 and two fixed parallel threaded shanks 80 extending from the keeper. The threaded shanks 80 are arranged to be received in corresponding parallel slots 82 in the base portion 72 which open in the upper surface of the base portion. The base portion 72 also includes two multiple radii conduit receiving grooves 88, at least one cavity 84 for receiving the head of a bolt type fastener, and a tapered bore 86 for receiving a lag type fastener. The two conduit supporting bracket is assembled in the same manner as the three conduit supporting bracket which has been described above.

The conduit supporting bracket as illustrated in the drawings and described above is more easily mounted than known brackets. This ease of assembly is due to the fact that slots are provided for receiving each of the fastening members. As a result, there is no need for inserting a fastening member through a small bore or opening to connect two cooperating pieces or components of a bracket, or to connect the bracket to a support structure. In addition, the new bracket may be used with one or a plurality of conduits or channels, as well as with conduits or channels of different diameters.

The subject conduit supporting bracket is preferably formed of a cast aluminum construction. However, other materials and manners of construction may also be used to advantage without in any way departing from the overall intent or scope of the invention.

The invention has been described with reference to preferred embodiments. Obviously, modifications and alterations will occur to others upon a reading and understanding of this specification.

Having thus described the invention, it is claimed:

1. A conduit supporting bracket comprising:

a base portion having an upper surface including at least two spaced-apart slots therein, a first side surface including at least one first conduit retaining groove, and an elongated neck portion adapted for connecting the base portion to a support structure, said neck portion including a lower surface with at least one open cavity therein adapted for non-rotatably receiving a head portion of a fastener projecting from said support structure, wherein transverse slots are formed through the neck portion for alternatively attaching the base portion to the support structure by an elongated flexible band member; and, a keeper portion having a second side surface including at least one second conduit retaining groove and two spaced-apart shanks extending outwardly therefrom for receipt in the spaced-apart slots in the base portion such that the at least one first and second conduit retaining grooves are substantially aligned in opposed facing relation with each other.

2. The conduit supporting bracket according to claim 1, wherein the spaced-apart shanks extending outwardly from the keeper portion are permanently fixed to the keeper portion.

3. A method of securing a conduit relative to a support structure having a fastener with a head and an elongated shank projecting therefrom, said method comprising:

cutting away a length of an elongated neck of a base portion of a conduit supporting bracket to a desired standoff distance by which said conduit supporting bracket separates the support structure and an associated conduit to be secured;

affixing the base portion of the conduit supporting bracket to the support structure by positioning the elongated neck of the base portion over said projecting head of said fastener so that said head is non-rotatably received in an open cavity formed partially through said base portion;

advancing a first retainer on the shank of the fastener;

placing at least one conduit in a conduit receiving groove included in the base portion;

selectively connecting a conduit keeper portion to the base portion by positioning the keeper portion in surrounding relation with the conduit and sliding a plurality of shafts projecting from one of the base portion and the keeper portion into corresponding upwardly facing open slots formed into an outer surface of the other of the base portion and the keeper portion; and, securing the conduit between the base portion and the keeper portion by advancing a second retainer on each of the plurality of shafts.

4. A conduit supporting bracket comprising:

a base portion having an upper surface with at least two spaced-apart slots therein, said slots opening in said upper surface and extending downwardly away from said upper surface and into the base portion, a first side surface generally transverse to said upper surface and including at least one first conduit retaining groove, and an elongated neck portion adapted for securing the base portion to a support structure, said neck portion including a lower surface, generally opposite said upper surface, with a plurality of open cavities formed therein each adapted for non-rotatably receiving a head portion of a fastener, said elongated neck portion defining a stand-off distance from said support structure which is variable by cutting away a portion of said neck portion so that at least one of said plurality of open cavities is in a remaining portion of said elongated neck portion; and, a keeper portion having a second side surface including at least one second conduit retaining groove and at least two spaced-apart shanks extending outwardly from and generally normal to the second side surface spaced and arranged to be cooperatively received in the spaced-apart slots in the base portion such that the at least one first and second conduit retaining grooves are substantially aligned in opposed facing relation with each other and adapted to receive an associated conduit therebetween.

5. A conduit supporting bracket comprising:

a first bracket portion including a conduit engaging surface, means adapted to attach the first bracket portion to a support structure at one of a plurality of different stand-off distances, and a plurality of spaced-apart slots therein and opening in a first surface lying generally transverse to the conduit engaging surface;

a second bracket portion selectively connectable to said first bracket portion including a conduit engaging surface and a plurality of threaded shafts extending outwardly therefrom and spaced-apart to be cooperatively received in the plurality of spaced-apart slots in the first bracket portion; and a fastener cooperatively threaded onto each of the plurality of shafts, wherein each of the shafts is adapted for selective placement into a respective one of the spaced-apart slots so that the conduit engaging surfaces of the first and second bracket portions are aligned in opposed facing relation with each other, wherein said first bracket portion attachment means comprises a plurality of open cavities formed in an elongated portion of said first bracket portion along a length thereof, each of said cavities adapted to non-rotatably receive a fastener head projecting from said support surface when said bracket first portion is positioned over said projecting fastener, said elongated portion of said first bracket portion adapted for shortening by removal of at least a section thereof which includes an open cavity therein.

* * * * *